US010853177B2

(12) United States Patent
Casey

(10) Patent No.: US 10,853,177 B2
(45) Date of Patent: Dec. 1, 2020

(54) PERFORMANT PROCESS FOR SALVAGING RENDERABLE CONTENT FROM DIGITAL DATA SOURCES

(71) Applicant: Government of the United States, as represented by the Secretary of the Air Force, Wright-Patterson AFB, OH (US)

(72) Inventor: Eoghan Casey, Lausanne (CH)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 140 days.

(21) Appl. No.: 16/014,067

(22) Filed: Jun. 21, 2018

(65) Prior Publication Data
US 2019/0034280 A1     Jan. 31, 2019

Related U.S. Application Data

(60) Provisional application No. 62/537,492, filed on Jul. 27, 2017.

(51) Int. Cl.
*G06F 11/14*     (2006.01)
*G06F 7/02*     (2006.01)
(Continued)

(52) U.S. Cl.
CPC .......... *G06F 11/1402* (2013.01); *G06F 7/02* (2013.01); *G06F 11/008* (2013.01); *G06F 11/3013* (2013.01); *G06F 16/162* (2019.01)

(58) Field of Classification Search
CPC .............. G06F 11/1402; G06F 11/008; G06F 11/1008; G06F 7/02; G06F 11/3013; G06F 16/162
See application file for complete search history.

(56) References Cited

U.S. PATENT DOCUMENTS 5,428,630 A * 6/1995 Weng .................. G06F 11/1008
711/141
5,832,526 A * 11/1998 Schuyler ............. G06F 11/1435
714/42
(Continued)

OTHER PUBLICATIONS

Pal, A., et al., "The Evolution of File Carving," IEEE Signal Processing Magazine, Mar. 2009, pp. 59-71.
(Continued)

*Primary Examiner* — Yolanda L Wilson
(74) *Attorney, Agent, or Firm* — AFMCLO/JAZ; Timothy M. Barlow

(57) ABSTRACT

Salvaging renderable content includes providing a set of salvaging instructions including a digital pattern associated with digital content to be salvaged, and a predetermined minimum threshold of usefulness of the digital content. A digital data source includes digital content to be salvaged. The digital content is simultaneously read by reviewing the multiple types of digital content independently of one another using separate software salvaging modules to review each specific type of digital content. The digital content is filtered by identifying potentially recoverable digital content. The digital pattern is compared to the filtered digital content to indicate matches between the filtered digital content and the digital pattern. The digital content is reassembled and/or repaired. The matched digital content is validated by determining whether the salvaged digital content is in a form that meets the predetermined minimum threshold of usefulness. The validated digital content is displayed/rendered.

20 Claims, 13 Drawing Sheets

(51) Int. Cl.
*G06F 11/00* (2006.01)
*G06F 11/30* (2006.01)
*G06F 16/16* (2019.01)

(56) References Cited

U.S. PATENT DOCUMENTS

| | | | |
|---|---|---|---|
| 6,173,291 | B1 | 1/2001 | Jenevein |
| 7,644,138 | B2 | 1/2010 | Sun |
| 8,219,588 | B2 | 7/2012 | Bousquet et al. |
| 8,407,192 | B2 | 3/2013 | Memon et al. |
| 8,656,095 | B2 | 2/2014 | Coulter |
| 9,081,753 | B2 | 7/2015 | Paleologu et al. |
| 9,164,874 | B1* | 10/2015 | Tomay ............... G06F 11/366 |
| 9,264,257 | B2 | 2/2016 | Le |
| 9,367,397 | B1* | 6/2016 | Xie ................... G06F 16/162 |
| 9,437,020 | B2* | 9/2016 | Mukhopadhyay .... G06T 11/203 |
| 2003/0179418 | A1* | 9/2003 | Wengender ........... H04N 1/401 358/437 |
| 2007/0198607 | A1 | 8/2007 | Memon et al. |
| 2008/0279418 | A1 | 11/2008 | Martinek et al. |
| 2009/0287956 | A1* | 11/2009 | Flynn ................ G06F 11/1008 714/6.12 |
| 2010/0257146 | A1 | 10/2010 | Memon et al. |
| 2013/0335432 | A1* | 12/2013 | Iwasaki ............. G06F 11/1008 345/522 |
| 2014/0215279 | A1* | 7/2014 | Houseman .......... G06F 11/2268 714/47.3 |
| 2015/0100819 | A1 | 4/2015 | Fedorov et al. |
| 2015/0154061 | A1* | 6/2015 | Camp ................ G06F 11/1012 714/6.13 |
| 2015/0378800 | A1* | 12/2015 | Suzuki ................ G06F 3/0679 714/49 |
| 2016/0027406 | A1* | 1/2016 | Fiedler ............... G06F 11/1004 345/501 |
| 2016/0203046 | A1* | 7/2016 | Hanafusa ........... G06F 11/1068 714/764 |

OTHER PUBLICATIONS

Ayers, D., "A second generation computer forensic analysis system," Digital Investigation 6, 2009, pp. S34-S42.

Fortuna, A., "Four tools for File Carving in forensic analysis," Cybersecurity Forensics Security Technology Tools, https://www.andreafortuna.org/cybersecurity/four-tools-for-file-carving-in-forensic-analysis/, Apr. 20, 2017, 2 pages.

Garfinkel, S., "Carving Contiguous and Fragmented Files with Object Validation," Digital Investigation 4S, 2007, pp. S2-S12.

Pungila, C., "Improved File-Carving Through Data-Parallel Pattern Matching for Data Forensics," 2012 7th IEEE International Symposium on Applied Computational Intelligence and Informatics (SACI), May 24-26, 2012, Timisoara, Romania, 6 pages.

Skrbina, N., et al., "Using Parallel Processing for File Carving," The 9th Conference for Informatics and Information Technology (CIIT 2012), Apr. 19-22, 2012, Molika, Bitola, Macedonia, pp. 175-179.

Pal, A., et al., "File Carving:SmartCarving," https://forensicswiki.org/wiki/File_Carving:SmartCarving, Sep. 25, 2012, 3 pages.

Defense Cyber Crime Institute, "User Guide for DCCI_StegCarver," v5.7.2, Nov. 2011, pp. 1-26.

Casey, E., et al., "Design tradeoffs for developing fragmented video carving tools," Digital Investigation 11, 2014, pp. S30-S39.

* cited by examiner

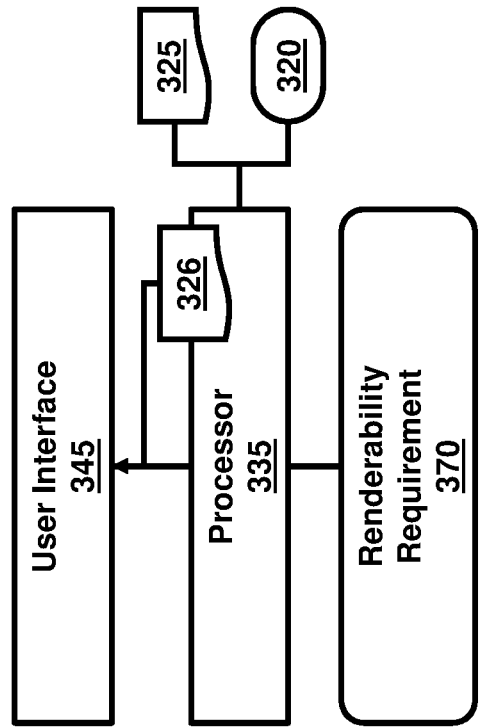
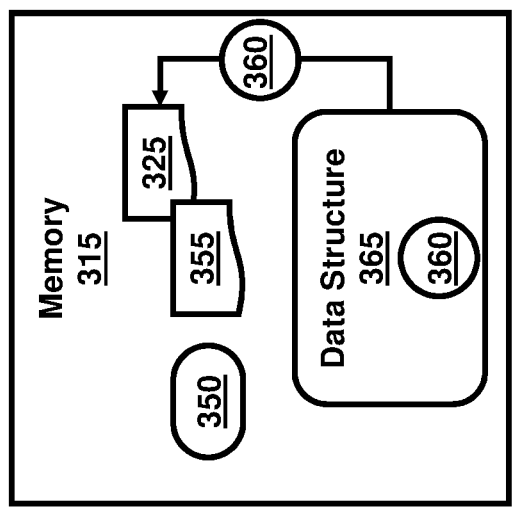
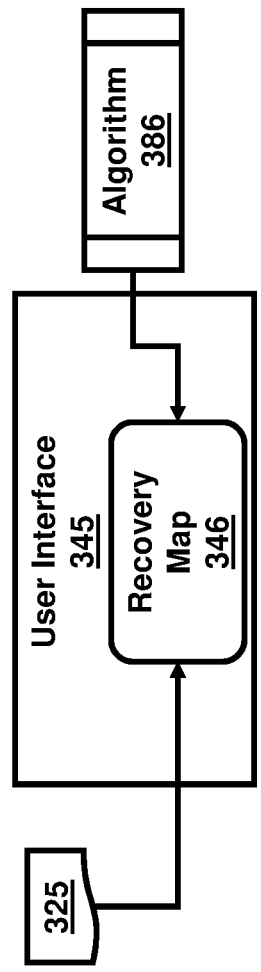

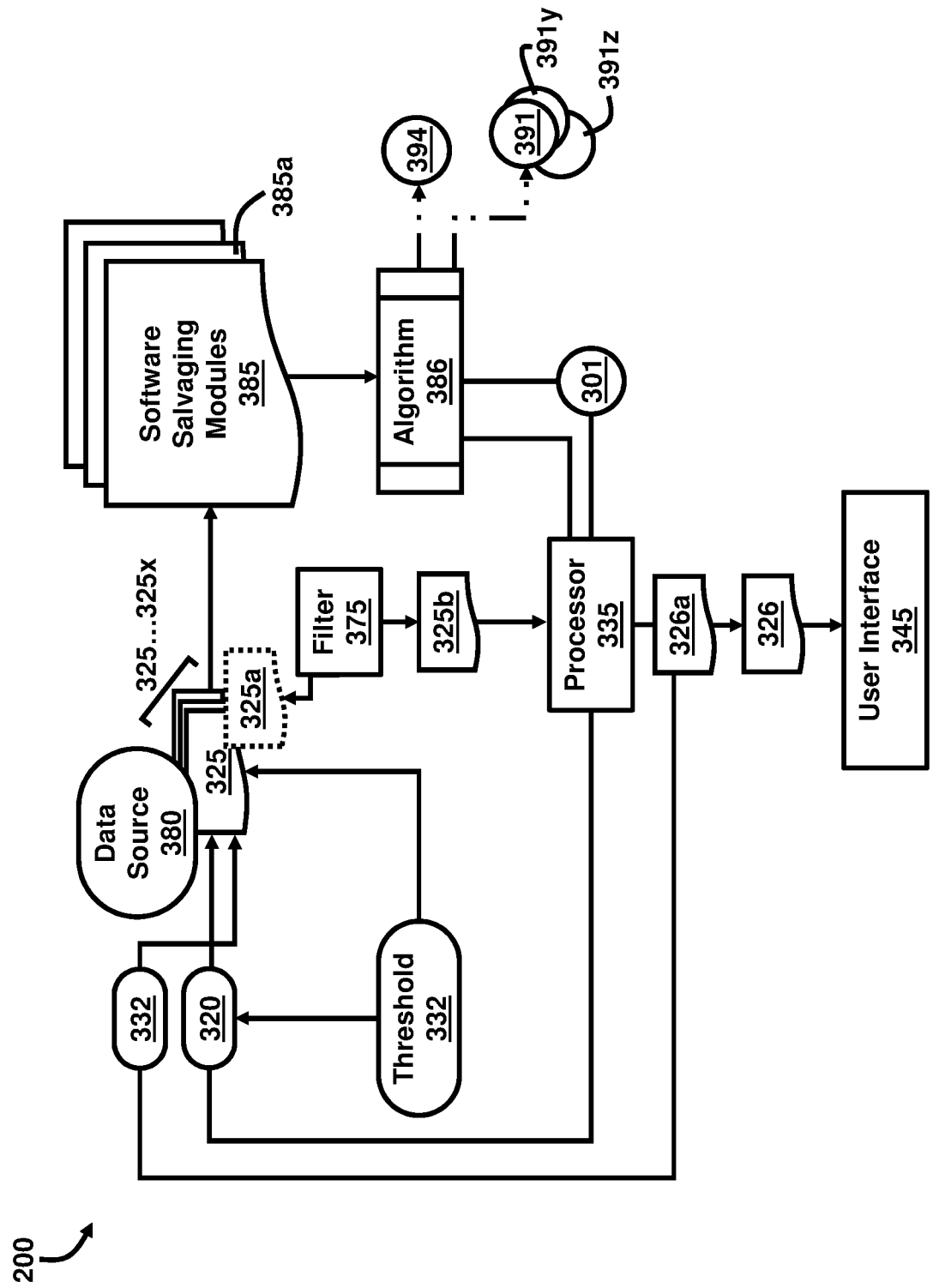

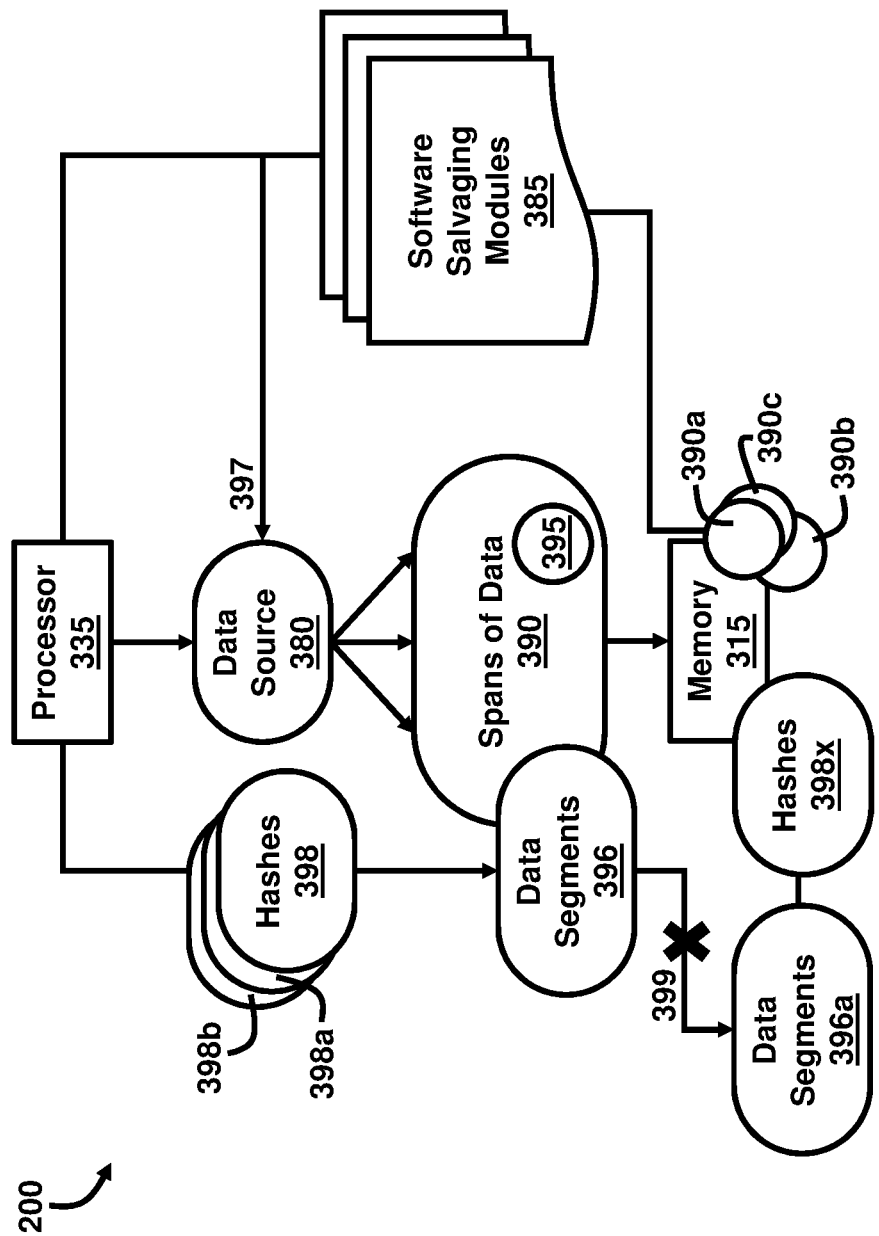

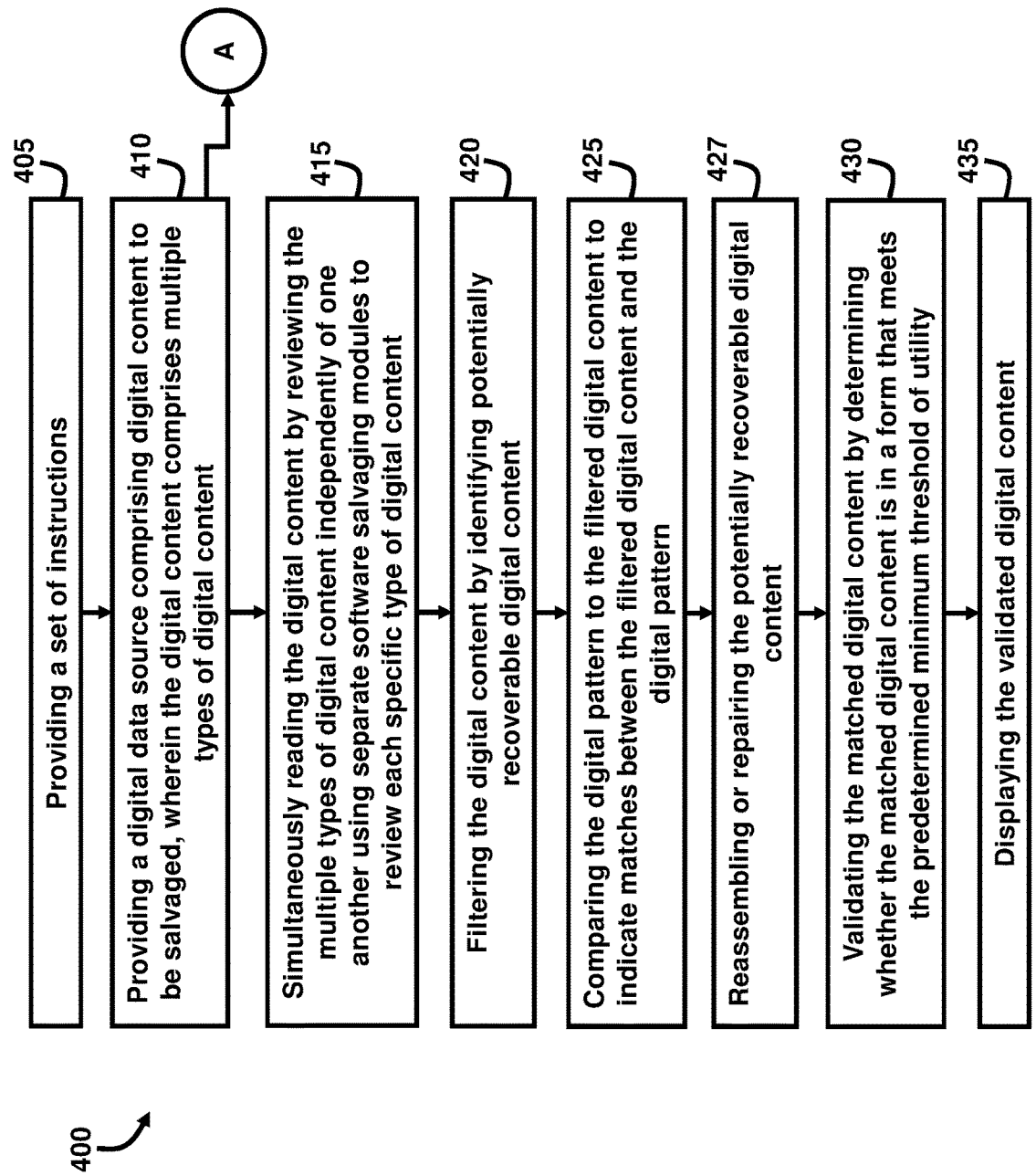

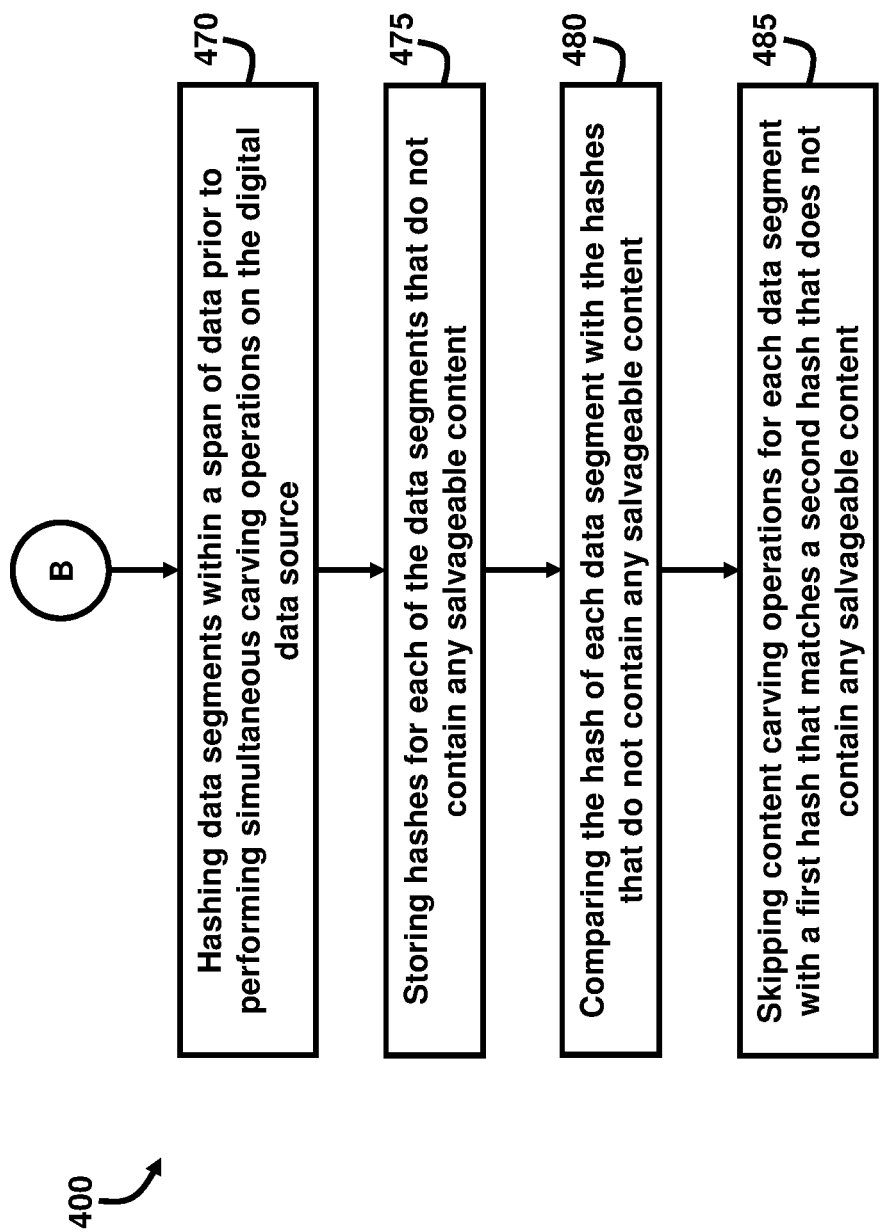

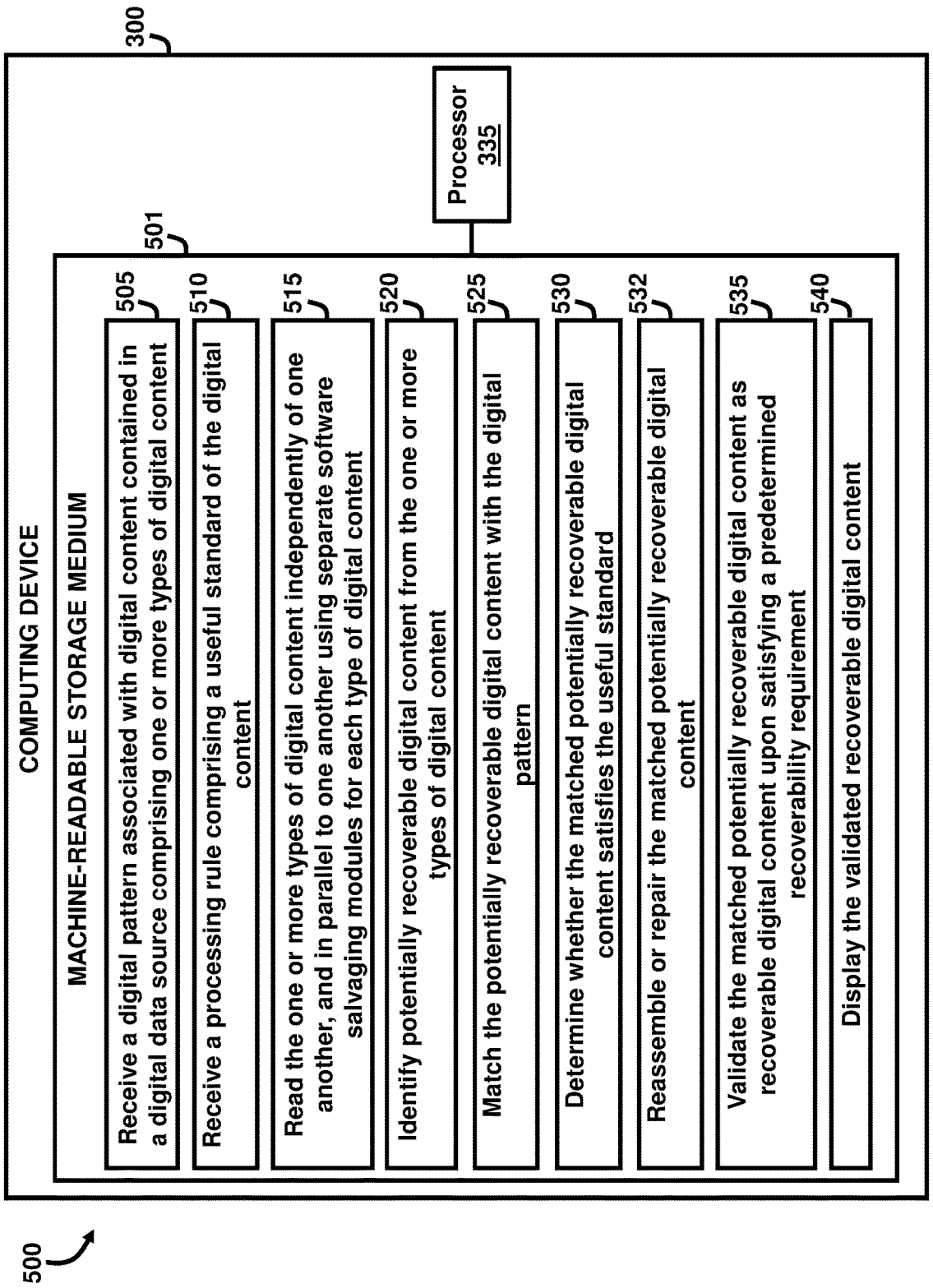

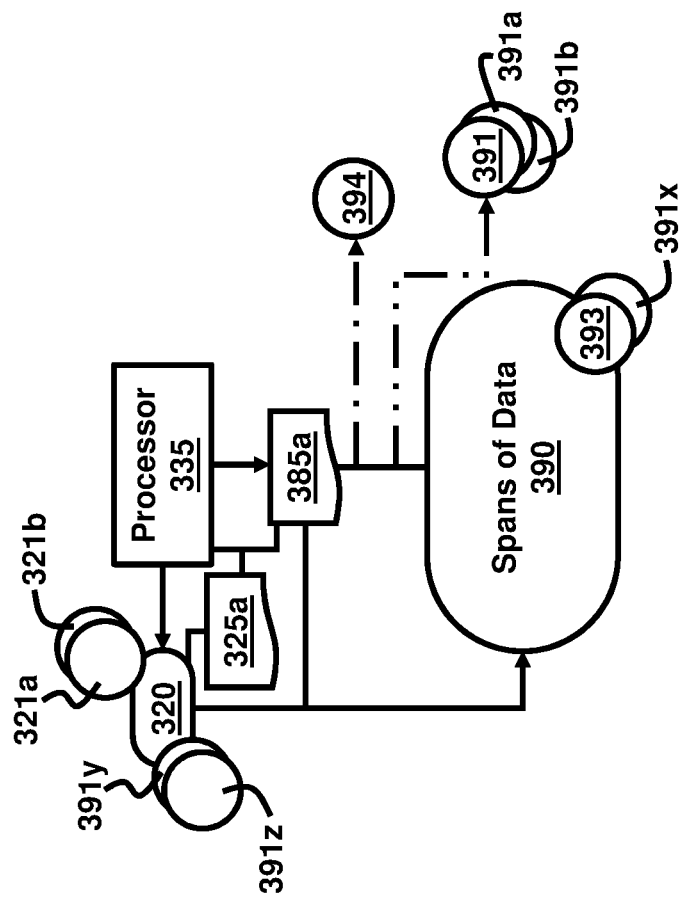

PERFORMANT PROCESS FOR SALVAGING RENDERABLE CONTENT FROM DIGITAL DATA SOURCES

CROSS-REFERENCE TO RELATED APPLICATION(S)

This application claims the benefit of U.S. Provisional Patent Application No. 62/537,492 filed on Jul. 27, 2017, which is incorporated herein by reference in its entirety.

GOVERNMENT INTEREST

The invention described herein may be manufactured and used by or for the Government of the United States for all government purposes without the payment of any royalty.

BACKGROUND

Field of the Invention

The embodiments herein generally relate to data carving, and more particularly to digital data and techniques for finding and salvaging renderable content, and reducing false positive output.

Background of the Invention

There is an important distinction between file carving and the more generalized processes of salvaging renderable content. While both file carving and salvaging renderable content can provide an original deleted file intact if the file is not partially overwritten or fragmented, salvaging renderable content also provides for recovery, repair, and rendering of content fragments that are no longer recoverable as intact files, i.e., not recoverable using file carving methods. In addition, file carving can result in a large amount of false positive output that cannot be rendered, whereas salvaging renderable content reduces such false positives. As such, salvaging renderable content encompasses and exceeds file carving, providing more renderable content and less false positive output than file carving.

In one example, files may be saved to digital media storage devices and organized by a file system. Such a file system maintains metadata structures for files on a digital media storage device, which can include file names and locations of file content on the device. These file system metadata structures are stored on the digital media storage device. When a new file is saved to the device the area on the device used to store the file's content is recorded in the file system metadata structures. Operating systems will use the file system metadata structures to present the file system as a structure of folders and files or to find file locations on the device when it wants to read or write a file content. When a file is deleted, the entry for that file is either updated to mark the file as deleted or removed from the file system metadata structures, and the location of the file content is made available for new files to be saved to the device. Deleting a file does not necessarily remove the file content from the digital media storage device, but it may remove information about where the file content was located on the device. The content will remain on the device until it is overwritten by other content.

In a second example, content may be transmitted over networks. The content is encapsulated in network protocols, and sometimes within additional layers of compression or encoding. In a third example, content may be stored in memory of digital devices. The content is contained within data structures, many of which are not well understood or documented.

In the context of the above examples, salvaging renderable content is the practice of searching for, salvaging, and making renderable specific types of content from any of these (and other) data sources without knowledge of the file system structures, network protocols, and in-memory data structures. However, salvaging renderable content is challenging when the surrounding structures and context are unknown.

To clarify the difference between file carving and salvaging renderable content, consider an example of file carving that searches a digital data source for files that begins with a known sequence of bytes. For example, all JPEG images begin with the two bytes FF D8 (represented here in hexadecimal form). When those two bytes are found, the succeeding bytes must be read to determine if it is actually a JPEG and where the JPEG file ends. If those two bytes have been overwritten, other methods must be used to salvage the remaining content of the JPEG. Furthermore, even if those two bytes are present, file carving might not be able to recover a complete file.

Salvaging renderable content can also be used to recover fragments of deleted files. Fragmentation occurs when a file is stored in noncontiguous regions of the storage medium, which happens frequently. Before a fragmented file is deleted, it can be read using its associated metadata structures in the file system to find each piece of the file and how to arrange the file pieces. Since salvaging renderable content does not use the metadata structures it is often extremely difficult to find and render an individual fragment. The same approach to searching for, salvaging, and rendering content can be applied to any digital data source, including network traffic, memory, and undocumented data structures.

There have been several tools which are capable of some level of carving for specific file types, typically referred to as file carving tools. Historically, file carving tools search for data that match the format for headers associated with specific file types. When specific file headers are identified, associated data may be recovered from the adjacent data. File carving methods that search for headers are only partially successful in locating and recovering specific file types. When files are partially overwritten on a storage medium, portions of the original content may be missing while the remaining content can be salvaged. File carving tools that only search for headers will not be able to recover partial content that do not have headers. In addition, such tools often incorrectly designate and report extracted data as being "recovered" according to a specific file type, when, in fact, the extracted data does not constitute a recovered file. This incorrect designation of data as being recovered files is known as identifying "false positive" output. The fact that recovered data is a false positive is typically discovered by users when they attempt to open the resulting output and find that no renderable content had, in fact, been salvaged.

Historically, a significant amount of time is required for a carving tool to complete carving a particular data source. Some tools increase carving speed by only searching at sector boundaries in data storage and therefore skip past sections of data which may contain data associated with recoverable content. Some conventional tools take a significantly long time to run (e.g., days to weeks) and result in thousands of false positive output that are recovered and reported.

Accordingly, previously existing file carving methods are generally inefficient and do not fulfill the need for speed in today's complex data analytics processes that require scalability and timely results. Furthermore, many file carving tools use simplistic techniques that result in significant qualities of false positives and false negatives. False positives are problematic because they result in false positive output that forensic examiners must waste time reviewing in order to find successfully salvaged content. False negatives are problematic because they could contain relevant digital evidence, particularly when an offender attempted to destroy the data. These problems are exacerbated when more advanced recovery methods are used, resulting in slower runtime and more false positive output.

BRIEF SUMMARY OF THE INVENTION

In view of the foregoing, an embodiment herein provides a computing device comprising a memory to store a digital pattern associated with computer-recoverable digital content contained in multiple types of digital content; and a computer-executable processing rule defining a predetermined threshold of usefulness of the computer-recoverable digital content. The computing device further comprises a processor to write the multiple types of digital content into a specified location in the memory; read the multiple types of digital content simultaneously to one another and independently of one another; identify the computer-recoverable digital content from the multiple types of digital content; compare the computer-recoverable digital content with the digital pattern; reassemble or repair the computer-recoverable digital content; and remove, from the specified location in the memory, the computer-recoverable digital content that does not satisfy the predetermined threshold of usefulness. The computing device further comprises a user interface to display the computer-recoverable digital content remaining in the specified location in the memory.

The specified location in the memory may comprise a virtual storage location to store the computer-recoverable digital content, and the user interface may display the computer-recoverable digital content stored in the virtual storage location. The memory may store metadata of the computer-recoverable digital content in a retrievable renderable fragment of the computer-recoverable digital content stored in the memory. The computer-recoverable, renderable digital content may comprise complete or partial electronic files that have been deleted, corrupted, or embedded in another data structure. The processor may compare the computer-recoverable digital content with the digital pattern in a unique manner for each type of digital content being read. The processor may validate the computer-recoverable digital content based on whether the computer-recoverable digital content is in a form that is useable according to a renderability requirement. The user interface may display only validated computer-recoverable digital content.

Another embodiment provides a computer-executable method for salvaging renderable content comprising and providing a set of salvaging instructions comprising a digital pattern associated with digital content to be salvaged; and a predetermined minimum threshold of usefulness of the digital content. The computer-executable method for salvaging renderable content further comprises providing a digital data source comprising digital content to be salvaged, wherein the digital content comprises multiple types of digital content; simultaneously reading the digital content by reviewing the multiple types of digital content independently of one another using separate software salvaging modules to review each specific type of digital content; filtering the digital content by identifying potentially recoverable digital content; comparing the digital pattern to the filtered digital content to indicate matches between the filtered digital content and the digital pattern; reassembling or repairing the potentially recoverable digital content; validating the matched digital content by determining whether the matched digital content is in a form that meets the predetermined minimum threshold of usefulness; and displaying the validated digital content.

The computer-executable method for salvaging renderable content may further comprise segmenting the digital data source into spans of data; storing a current span of data to be read, a predetermined number of previously read spans of data, and a subsequent span of data to be read; and reading the entire current span of data by all of the software salvaging modules prior to reading the subsequent span of data. The computer-executable method for salvaging renderable content may further comprise searching within a span of data for the digital pattern. The computer-executable method for salvaging renderable content may further comprise preventing any one of the software salvaging modules to read a subsequent span of data until all of the software salvaging modules have read the entire current span of data.

The computer-executable method for salvaging renderable content may further comprise comparing the spans of data to one another to determine whether the digital content contained in any particular span of data is recoverable. The computer-executable method for salvaging renderable content may further comprise hashing data segments within a span of data prior to performing simultaneous salvaging operations on the digital data source; storing hashes for each of the data segments that do not contain any salvageable content; and comparing the hash of each data segment with the hashes that do not contain any salvageable content. The computer-executable method for salvaging renderable content may further comprise skipping recover operations for each data segment with a first hash that matches a second hash that does not contain any salvageable content.

Another embodiment provides a non-transitory computer readable medium comprising computer-executable instructions that when executed cause a processor of a computing device to receive a digital pattern associated with digital content contained in a digital data source comprising one or more types of digital content; receive a processing rule comprising a useful standard of the digital content; read the one or more types of digital content independently of one another, and in parallel to one another using separate software salvaging modules for each type of digital content; identify potentially recoverable digital content from the one or more types of digital content; match the potentially recoverable digital content with the digital pattern; determine whether the matched potentially recoverable digital content satisfies the useful standard; reassemble or repair the matched potentially recoverable digital content; validate the matched potentially recoverable digital content as recoverable digital content upon satisfying a predetermined recoverability requirement; and display the validated recoverable digital content.

The processor may instruct a software salvaging module to skip ahead in a span of data, during a reading process of bytes of data, by a length of bytes that the software salvaging module is searching. The software salvaging module may step through the bytes of data in a span of data associated with a single data content type; land on a first byte of data in the span of data; determine whether the first byte of data matches one of the bytes associated with the single data content type; and check whether the digital pattern is present in the span of data when the first byte of data matches one of the bytes associated with the single data content type.

The software salvaging module may check whether a second byte of data that is next to or previous to the first byte of data matches the next or previous byte of data in the digital pattern. The software salvaging module may shift to a next byte of data when the first byte of data matches a first byte of data in the digital pattern to determine whether the potentially recoverable digital content matches with the digital pattern. The software salvaging module may shift to a previous byte of data when the first byte of data matches a second byte of data in the digital pattern to determine whether the potentially recoverable digital content matches with the digital pattern.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 is a block diagram further illustrating the memory of the computing device of FIG. 3, according to an embodiment herein;

FIG. 6 is a block diagram further illustrating the processor of the computing device of FIG. 3, according to an embodiment herein;

FIG. 7 is a block diagram further illustrating the user interface of the computing device of FIG. 3, according to an embodiment herein;

FIG. 8A is a first block diagram illustrating a system for salvaging renderable content, according to an embodiment herein;

FIG. 8B is a second block diagram illustrating a system for salvaging renderable content, according to an embodiment herein;

FIG. 10A is a flow diagram illustrating a first aspect of a method for salvaging renderable content, according to an embodiment herein;

FIG. 10C is a flow diagram illustrating a third aspect of a method for salvaging renderable content, according to an embodiment herein;

FIG. 11 is a block diagram illustrating a computer-implemented system for salvaging renderable content, according to an embodiment herein; and FIG. 12 is a block diagram illustrating aspects of the processor of FIG. 11, according to an embodiment herein.

DETAILED DESCRIPTION OF THE INVENTION

Figure 1:
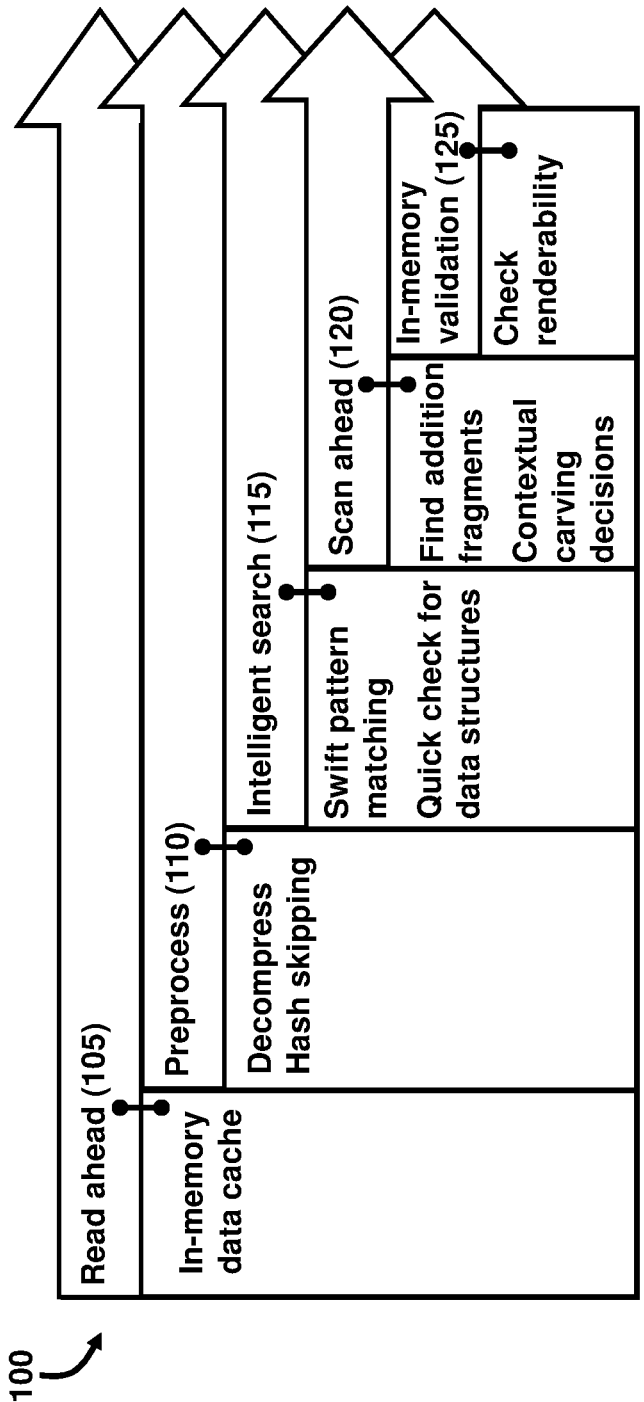
FIG. 1 is a block diagram illustrating a process for salvaging renderable content with associated sub-processes, according to an embodiment herein.

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

According to various examples, the embodiments herein provide a software-enabled automated data recovery/salvaging method that carves content from any digital data source in parallel, and simultaneously utilizes searching algorithms specific to multiple content types. In another example, the embodiments herein provide a software-enabled automated recovery/salvaging method that carves content from any digital data source using a highly optimized process, and simultaneously utilizes searching algorithms specific to multiple content types by the (a) utilization of input preprocessing to decrypt or decompress targeted data; (b) utilization of algorithms to identify unallocated or slack space in the digital storage medium, when applicable, to define the data storage space that will be subject to salvaging renderable content operations; (c) utilization of data caching to limit independently-operating salvaging algorithms from advancing beyond read blocks of data until all salvaging algorithms have operated on that data in a manner to prevent data thrashing; (d) utilization of hash skipping to identify and eliminate from further processing replicas of the same data located elsewhere in the interrogated digital media; (e) utilization of swift pattern matching; (f) automated validation of salvaged content before being reported/displayed as capable of being opened/used in the targeted content format, and (g) display of validated content, recovered through salvaging renderable content processes, in a virtual drive.

The embodiments herein utilize data caching to limit independently-operating salvaging algorithms operating in parallel from advancing beyond read blocks of digital data until all salvaging algorithms have operated on that data in a manner to prevent data thrashing. Furthermore, the embodiments herein provide a salvaging method that utilizes hash skipping to identify and eliminate from further salvaging operations, replicas of the same data located elsewhere in the interrogated digital media. Additionally, the embodiments herein provide a salvaging method that utilizes string searching other pattern detection mechanisms. Moreover, the embodiments herein provide a method by which salvaged content are validated automatically before being reported as capable of being opened/used in the targeted file format.

The embodiments herein provide a technique for data recovery using software salvaging modules that find, salvage, and render content from any digital data source. There is a different module for each type of content that is to be searched and salvaged. The different modules perform the search and salvage operations simultaneously (i.e., in parallel) with one another. Accordingly, each software module is a separate content-type carver. In this regard, the software maintains parallel processes for reading data and for saving carved content in a virtual storage drive in the system's memory. Each module is responsible for reading the medium for data and commanding the salvaging platform to save recovered content. The method includes providing a data source that has content to be recovered, performing a data caching process, performing a hash skipping process, perform a pattern matching process, and performing a validation processes. Referring now to the drawings, and more particularly to FIGS. 1 through 12, where similar reference characters denote corresponding features consistently throughout, there are shown exemplary embodiments. In the drawings, the size and relative sizes of layers and regions may be exaggerated for clarity.

FIG. 1 illustrates a block diagram of an automated process 100 for salvaging renderable content and validating the results, which recovers content more quickly, and reduces false positives and false negatives compared with conventional file carving methods. The general process 100 described in FIG. 1 may include several sub-processes: read ahead process 105, pre-process 110, intelligent search process 115, scan ahead process 120, and in-memory validation process 125. The sub-processes 105-125 are not necessarily sequential, as some steps may occur in parallel or out of sequence. Any of the sub-process 105-125 can use parallelized modules. Generally, the read ahead process 105 may include an in-memory data cache process. The pre-process 110 may include a decompress and hash skipping process. The intelligent search process 115 may include swift pattern matching and quick checking for data structure processes. An example of the intelligent search process 115 uses the well-known Boyer-Moore string search algorithm, as described in Boyer, R., et al., "A Fast String Searching Algorithm," Communications of the Association for Computing Machinery, 20(10), 1977, pp. 762-772, the complete disclosure of which, in its entirety, is herein incorporated by reference. Rather than searching each character of the input one-by-one to determine whether it matches the search pattern, the Boyer-Moore string search algorithm skips over part of the input. If the input character does not match any of the characters in the search pattern, the Boyer-Moore string search algorithm skips over an amount of the input equal to the length of the search pattern.

Another feature of the Boyer-Moore string search algorithm is that it performs the search starting with the last letter of the search pattern rather than the first letter. If the input string matches one of the characters in the search pattern, the Boyer-Moore string search algorithm shifts the search forward the necessary amount to align the end of the search string with the location where a match would be expected in the input. If this input character does not match the last character of the search string, it is not a hit and the Boyer-Moore string search algorithm skips an amount of the input equal to the length of the search string.

The scan ahead process 120 may include a search for additional fragments and contextual salvaging decision processes. The in-memory validation process 125 may include a check for renderability process. Generally, each sub-process 105-125 has individual unique characteristics compared to traditional carving methods and they work in tandem to deliver performant salvaging and validation, using parallel processing whenever possible, to produce results more quickly while reducing the about of false positive output. The extensible architecture utilized by the process 100 allows inclusion of additional salvaging modules and search mechanisms as the need or opportunity arises. This flexibility facilitates future performance enhancements as well as adaption to new use cases, such as triage carving in time-constrained contexts where completeness can be sacrificed to maximize speed. The constraint on overall performance for salvaging content is input read speed. The sub-process 105 seeks optimal methods for reading input data, including asynchronous reading of data into a staging buffer or data cache, allowing the pre-process 110 to be performed on an active salvaging buffer while simultaneously preparing more data for salvaging operations.

The process 100 employs fast searching methods in the intelligent search sub-process 115, taking advantage of search algorithms and methods, including multicore searching. When the search finds a match, salvaging modules have logic to quickly check for expected structures. The combination of accelerated searching with quick checks delivers more effective and efficient salvaging operations to find more salvageable content in less time. In addition, the sub-process 120 enables contextual salvaging decisions on the basis of more comprehensive overview of content, including reassembly or repair operations. Finally, conducting in-memory validation in sub-process 125 to determine whether files are renderable reduces the amount of false positive output resulting from the salvaging process 100. The process 100 carves data sources in hours that previously took days or weeks. Moreover, the process 100 salvages data that is not obtained by other tools. Reducing the number of false positive output equates to less time reviewing data that cannot be rendered, leaving more time to analyze renderable files.

Figure 2:
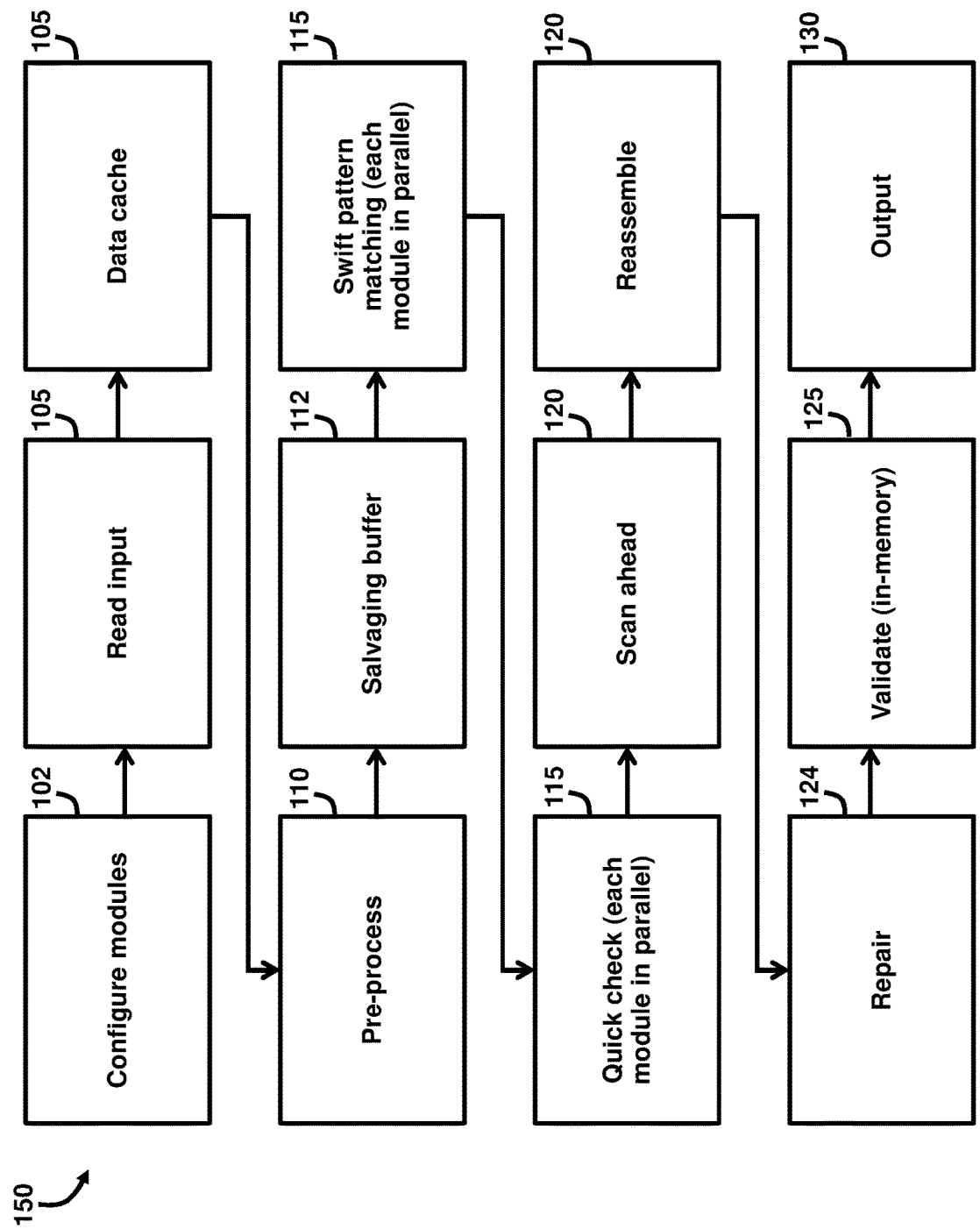
FIG. 2 is a general flow diagram illustrating a performant salvaging process, according to an embodiment herein.

FIG. 2, with reference to FIG. 1, illustrates an example of a sequence process 150 of salvaging renderable content, in accordance with the embodiments herein. The general process 150 shown in FIG. 2 describes additional interim sub-processes that occur in addition to the sub-processes 105-125 described with reference to FIG. 1. For example, software salvaging modules may be configured in sub-process 102. In this regard, some of the embodiments herein may be embodied as a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon. Such non-transitory computer readable storage media can be any available media that can be accessed by a special purpose device, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose device to perform a certain function or group of functions. Computer-executable instructions also include program modules that are executed by computers in stand-alone or network environments. Generally, program modules include routines, programs, components, data structures, objects, and the functions inherent in the design of special-purpose devices, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

In an exemplary embodiment, the various modules described herein and illustrated in the figures may be embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. From a software-enabled perspective, the various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a special computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such Oracle® relational databases), the data objects can be configured as a table or column. Other configurations include specialized objects, distributed objects, object-oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

In FIG. 2, sub-process 105 includes reading the data input and storing the data in a data buffer or cache. After the pre-process 110, data is loaded into a buffer/cache 112 in preparation for salvaging operations. After the pre-process 112, the sub-process 105 continues reading the data input into the data buffer in preparation for refreshing the data salvaging buffer. Each salvaging buffer is subjected to the swift pattern matching and quick checking process, for each module in parallel, during the intelligent search sub-process 115. Thereafter, the scan ahead process 120 occurs followed by a reassemble process 122 and a repair process 124 of the salvaged content. This is followed by the in-memory validation process 125 and an output process 130. Additional details for processes 100, 150 are provided in greater detail below.

Figure 3:
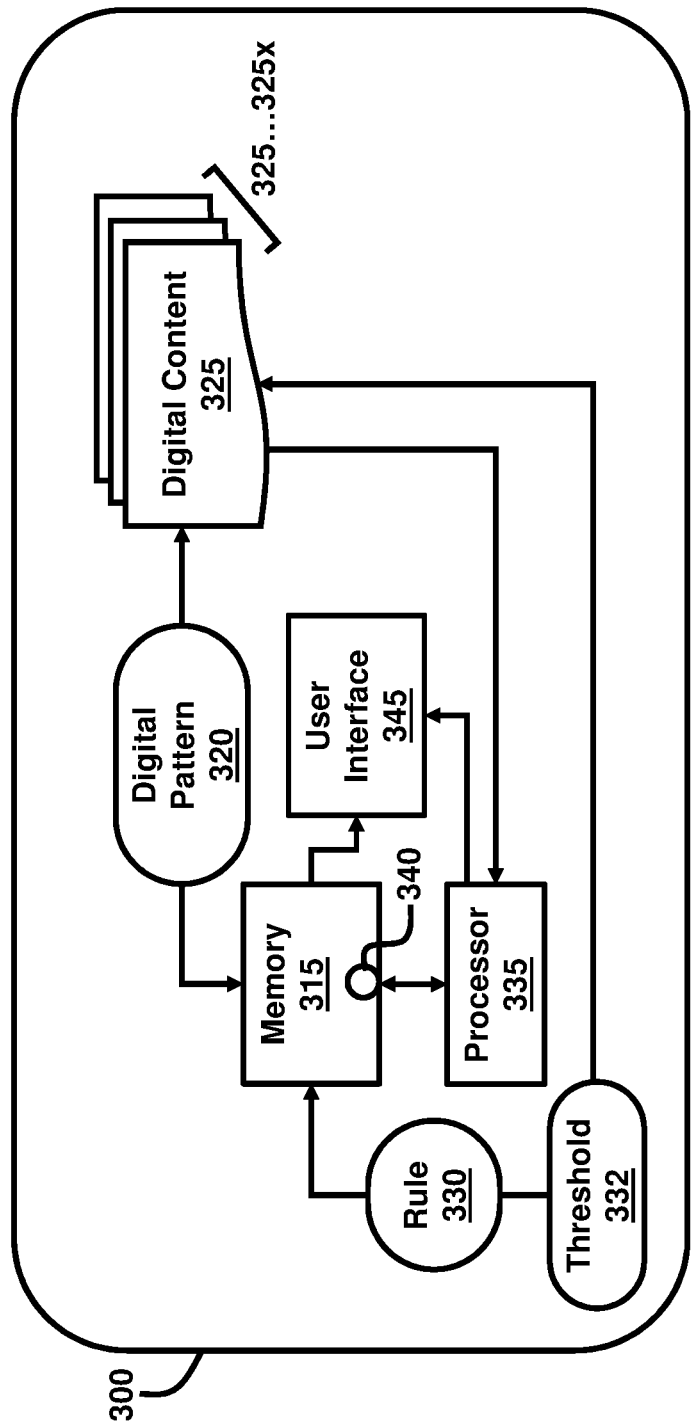
FIG. 3 is a block diagram illustrating a computing device for salvaging renderable content, according to an embodiment herein.

FIG. 3, with reference to FIGS. 1 and 2, illustrates a computing device 300 comprising a memory 315 to store a digital pattern 320 associated with computer-recoverable digital content 325 contained in multiple types of digital content 325 . . . 325x. The multiple types of digital content 325 . . . 325x may comprise any type of content stored in computer files such as text and documents, pictures, audio, video, and compressed archives. Moreover, the digital content 325 may be in any form included fragmented and segmented content, etc. The memory 315 may further store a computer-executable processing rule 330 defining a predetermined threshold of usefulness 332 of the computer-recoverable digital content 325. In an example, the memory 315 may be RAM memory, or any other suitable storage media. In an example, the computer-executable processing rule 330 that define the predetermined threshold of usefulness 332 comprises a set of computerized instructions that indicates whether the digital content 325 is in a form that is useful for its intended purpose. For example, if the digital content 325 is a picture file, then the threshold of usefulness 332 associated with a picture file may indicate that at least a certain percentage or number of pixels is available for viewing with respect to the digital content 325 in order for it to be useful for identification, analysis, or further processing by a forensic software tool. The computing device 300 further comprises a processor 335 to write the multiple types of digital content 325 . . . 325x into a specified location 340 in the memory 315. The specified location 340 in the memory 315 may refer to a specific device path location/address in memory 315 that is searchable (i.e., through query searching, etc.) to locate files that are stored in the memory 315.

The processor 335 is configured to read the multiple types of digital content 325 . . . 325x simultaneously to one another and independently of one another. In examples, the processor 335 may include a central processing unit (CPU), multiple CPUs, microprocessors, hardware engines, and/or other hardware devices. The processor 335 may use hardware and/or software drivers to read the multiple types of digital content 325 . . . 325x such that the drivers are pre-programmed to read the digital content 325 . . . 325x in parallel and independently. The processor 335 is configured to identify the computer-recoverable digital content 325 from the multiple types of digital content 325 . . . 325x. In this regard, the computer-recoverable digital content 325 may be identified based on the parameters established by the digital pattern 320 as well as the computer-executable processing rule 330 defining a predetermined threshold of usefulness 332 of the computer-recoverable digital content 325, according to an example.

The processor 335 is configured to compare the computer-recoverable digital content 325 with the digital pattern 320. The comparison may occur using an algorithm, as further described below. The processor 335 is further configured to reassemble or repair the computer-recoverable digital content 325. Moreover, the processor 335 is configured to remove, from the specified location 340 in the memory 315, the computer-recoverable digital content 325 that does not satisfy the predetermined threshold of usefulness 332. This process may occur based on the algorithm and the comparison process that the processor 335 performs. The computing device 300 further comprises a user interface 345 to display the computer-recoverable digital content 325 remaining in the specified location 340 in the memory 315. The user interface 345, in some examples, may be a display device, monitor, screen, or other visual output capable of outputting and presenting data.

Figure 4:
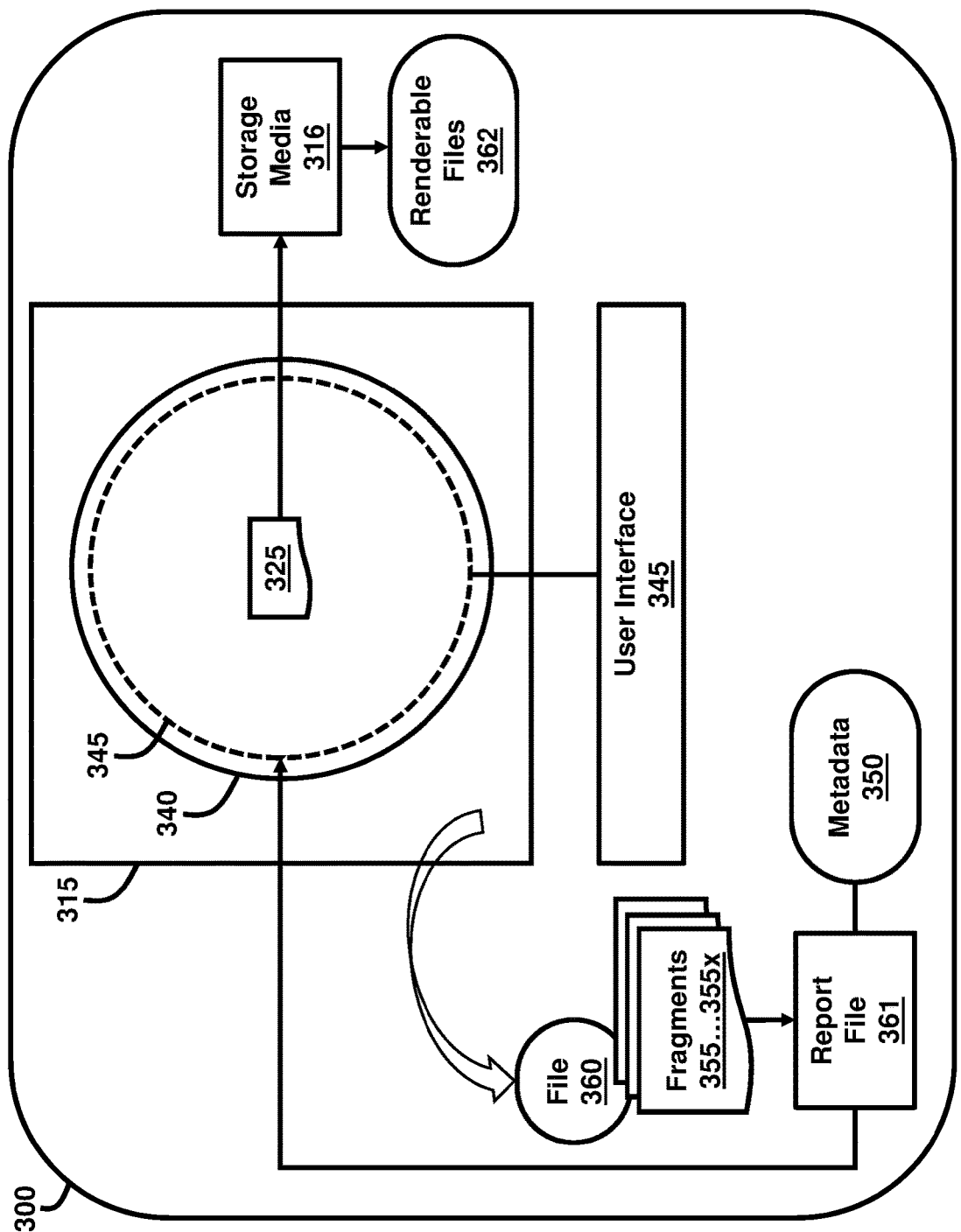
FIG. 4 is a block diagram illustrating virtualization techniques used for salvaging renderable content with the computing device of FIG. 3, according to an embodiment herein.

As indicated in FIG. 4, with reference to FIGS. 1 through 3, the specified location 340 in the memory 315 may comprise a virtual storage location 345 to store the computer-recoverable digital content 325, and the user interface 345 may display the computer-recoverable digital content 325 stored in the virtual storage location 345. In an example, the virtual storage location 345 may not be a physical location within the memory 315, but rather a virtual device path location/address that mimics a physical location and which may be used to mimic the storage of data in memory 315 without utilizing memory storage space. With respect to the virtual storage location 345 and the virtualization of the computer-recoverable digital content 325, when a file 360 is carved from a digital media storage device (e.g., memory 315), the location of the file 360 on the device 300, including retrievable renderable fragments 355 . . . 355x of the file 360 that combine to a single recovered file 360 is saved in a report file 361. In an example, the report file 361 may be a file system listing of metadata 350 created by the salvaging process 100 to store all locations of salvageable computer-recoverable digital content 325 that were carved off of the metadata 350 as stored in the originally interrogated medium (e.g., memory 315). The report file 361 is then used to create the virtual storage location 345 that may be browsed through the user interface 345. The process 100 may load previous reports, along with the corresponding content that was salvaged to create the report, to mount and display the results as the virtual storage location 345. Salvageable computer-recoverable digital content 325 may be selected from the virtual storage location 345 to be saved and written to other storage media 316 as renderable files 362.

As shown in FIG. 5, with reference to FIGS. 1 through 4, the memory 315 may store metadata 350 of the computer-recoverable digital content 325 in a retrievable renderable fragment 355 of the computer-recoverable digital content 325 stored in the memory 315. In an example, the renderable fragment 355 of the computer-recoverable digital content 325 may be a minimum amount or portion of the digital content 325 that is sufficient to satisfy the threshold of usefulness 332; i.e., the minimum amount of the digital content 325 that is useful for its intended purpose or application. The computer-recoverable digital content 325 may comprise complete or partial electronic files 360 that have been deleted, corrupted, or embedded in another data structure 365. In this regard, the digital content 325 may be stand-alone portions of files 360 or may be part of other data structures 365, such as applications, data object, or other files.

As shown in FIG. 6, with reference to FIGS. 1 through 5, the processor 335 may compare the computer-recoverable digital content 325 with the digital pattern 320 in a unique manner for each type of digital content 325 being read. In this regard, the processor 335 utilizes an algorithm, as described below, to perform a comparison analysis based on a pre-coded customization process according to the type of digital content 325 being read. For example, digital content 325 containing audio files are read and compared differently than digital content 325 containing image files, etc. The processor 335 may validate the computer-recoverable digital content 325 based on whether the computer-recoverable digital content 325 is in a form that is useable according to a renderability requirement 370. In this regard, the renderability requirement 370 may be analogous to the previously-described computer-executable processing rule 330 defining a predetermined threshold of usefulness 332, but the renderability requirement 370 may be dynamic and can be updated in real-time, if desired by a user. The user interface 345 may display only validated computer-recoverable digital content 326 based on the output provided by the processor 335.

The computing device 300 executing processes 100, 150 greatly reduces the amount of false positive output by validating that most salvageable computer-recoverable digital content 325 by correctly structuring the digital content 325. Validation of the data structure 365 has the potential to greatly reduce the number of useless files that a user will need to parse through to analyze. For example, the computing device 300 may only output valid JPEG files that may be opened and viewed instead of carving all JPEG files irrespective of whether they can actually be opened and/or viewed.

The computing device 300 provides for the automated and efficient salvaging and rendering of the full or partial contents of digital content 325 that may have been deleted, corrupted, or that are embedded inside another file (i.e., salvaging renderable content) from any data source. For example, the computing device 300 can be performed on data from computers, mobile devices, live memory, and network traffic. In particular, the embodiments herein provide for efficient parallel processing of multiple algorithms for searching for and salvaging renderable content, and incorporates validation to eliminate incomplete, corrupt, and otherwise unrenderable output (i.e., false positives). The embodiments herein also reduce false negatives compared previously existing recovery methods by salvaging digital content 325 that is not recovered by previously existing methods.

When producing results from salvaging operations, it is critical have transparency repeatability into the process. Errors or omissions can be caught in an audit log that records which processes were performed when, along with the results (expected or unexpected). Running the same tools twice on the same data should produce the same results. Furthermore, the output should include sufficient information for a person or tool to locate the salvaged data and extract it to obtain the same results.

Accordingly, as shown in FIG. 7, with reference to FIGS. 1 through 6, the computing device 300 generates detailed logs of its operations, sub-processes, and results and outputs the same on the user interface 345. The results include a recovery map 346 of salvageable digital content 325 which serves two purposes. First, these recovery maps 346 contain sufficient information about the location of salvaged digital content 325, as well as the steps to decode/reassembly the parts, to enable a forensic examiner or tool to repeat the process and thus verify the results. Second, these recovery maps 346 can be used themselves, instead of writing out all salvaged digital content 325. For instance, after the algorithm 386 is run against a piece of storage media (not shown), another forensic tool could use the resulting recovery maps to display the locations of salvaged digital content within its own user interface, pointing to the original locations on the storage media where the data can be found. In this way, it is not necessary for the algorithm 386 to output the actual salvaged contents, saving time and disk space in memory 315.

FIG. 8A, with reference to FIGS. 1 through 7, is a block diagram illustrating a system 200 for salvaging renderable content, according to an embodiment herein. The system 200 comprises a set of computerized instructions executed by the processor 335 and comprising a digital pattern 320 associated with digital content 325 to be salvaged (i.e., renderable for a useful purpose according to its application), and a predetermined minimum threshold of usefulness 332 of the digital content 325. A digital data source 380 comprising the digital content 325 to be salvaged is provided, wherein the digital content 325 comprises multiple types of digital content 325 . . . 325x. In an example, the digital data source 380 may comprise computer storage media from one or more electronic devices containing digital content 325. The digital data source 380 may be a group of networked devices, according to an example. Separate software salvaging modules 385 are provided to simultaneously read the digital content 325 by reviewing the multiple types of digital content 325 . . . 325x independently of one another. The modules 385 may be hardware modules, software modules, or a combination thereof, which are programmable and configured to run an algorithm 386. A filter 375 is provided to filter the digital content 325 by identifying potentially recoverable digital content 325a. The filter 375 may be a hardware or software filter used by, or part of, the algorithm 386 to perform filtering functions of the digital content 325. The processor 335 validates matched digital content 326a by determining whether the matched digital content 326a is in a form that meets the predetermined minimum threshold of usefulness 332. The validation is based on the pre-established rules provided by the algorithm 386, in one example, or the validation may be based on pre-programmed instructions executed by the processor 335, according to various examples. The user interface 345 displays the validated digital content 326.

The software salvaging modules 385 are configured to implement the searching algorithm 386 to optimize speed and accuracy when detecting digital content 325. In this regard, each one of the modules 385 individually implements the algorithm 386 since the computing device 300 does not parse the data 301 that the processor 335 caches. The searching algorithm 386 is configured to skip ahead by the length of bytes 394 that a module 385 is searching for. For example, the JPEG module 385a would search for FF D8 and therefore would do this by stepping in two-byte increments. When module 385a steps through the data 301 it checks the byte of data 391 that it lands on to determine if it matches either FF or D8. If module 385 does match FF or D8, the algorithm 386 checks that the entire digital pattern 320 is present with respect to the byte of data 391 that was matched. The algorithm 386 shifts the input to check if the next or previous byte of data 391y, 391z matches the next or previous byte of data 391y, 391z in the digital pattern 320. If the algorithm 386 first matched FF then it would shift to the next byte 391y in the pattern (D8) and check if the next byte 391y in the data 301 matches it. If the algorithm 386 matched D8 then it would shift to the previous byte 391z in the pattern (FF) and check if the previous byte 391y in the data 301 matches it. This stepping and shifting method is much faster and efficient than checking if every byte of data 391 in the data 301 matches FF especially when the digital pattern 320 is a long series of bytes.

As shown in the block diagram of system 200 in FIG. 8B, with reference to FIGS. 1 through 8A, the processor 335 segments the digital data source 380 into spans of data 390 comprising a particular span of data 395, and stores, in memory 315, a current span of data 390a to be read, a predetermined number of previously read spans of data 390b, and a subsequent span of data 390c to be read. The span of data 395 may be configured as data blocks, which allows for more efficient searching of the digital data source 380. The software salvaging modules 385 read the entire current span of data 390a by all of the software salvaging modules 385 prior to reading the subsequent span of data 390c. In this regard, the modules 385 utilize a sequential approach to ensure the span of data 390 has been properly analyzed, which is further described below.

The processor 335 hashes (e.g., using hashes 398 comprising a first hash 398a and a second hash 398b, etc.) data segments 396 within the span of data 390 prior to performing simultaneous salvaging operations 397 on the digital data source 380. Hashes 398x are stored in memory 315 for each of the data segments 396a that do not contain any salvageable content 399. In an example, asynchronous reading of the data source 380 is used to avoid interfering with other operations of the processor 335. The hashing process is further described below.

Figure 9:
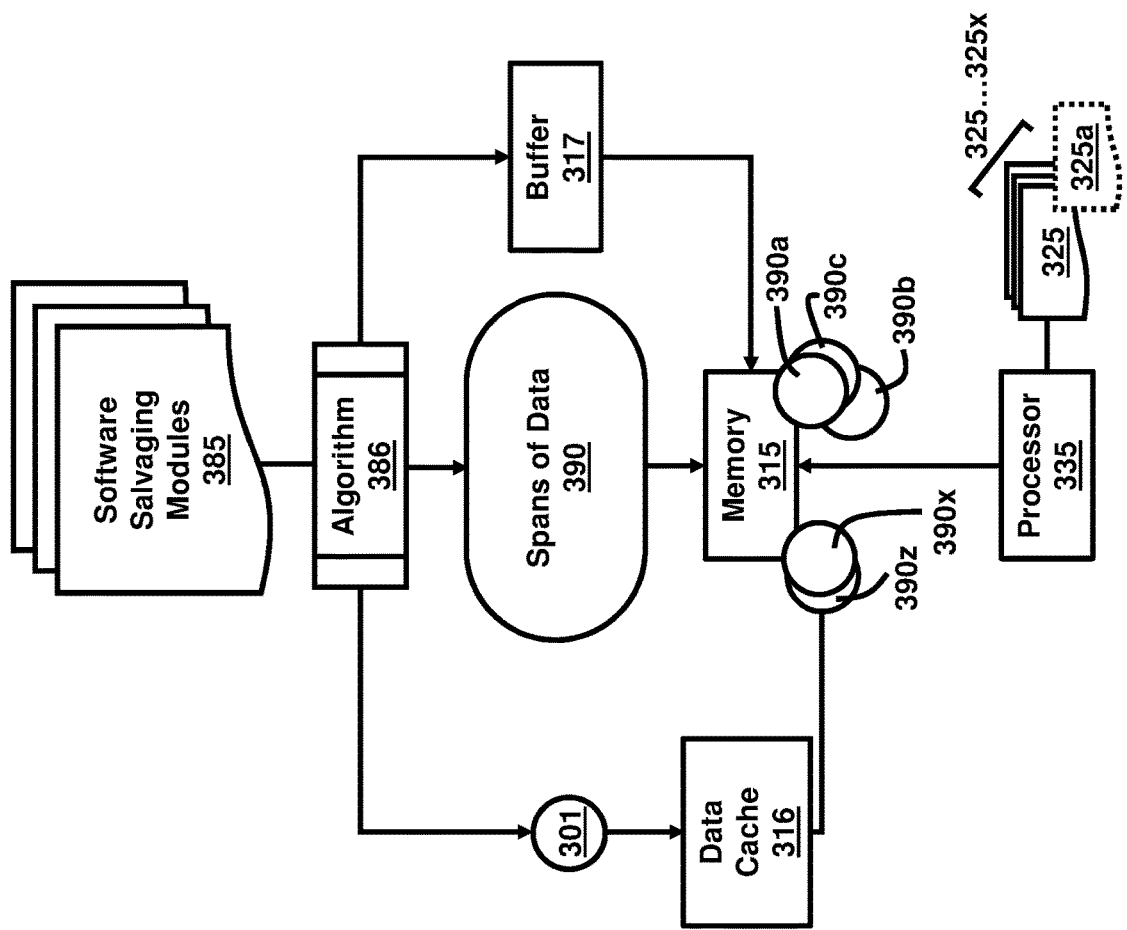
FIG. 9 is a block diagram illustrating aspects of an algorithm used for salvaging renderable content, according to an embodiment herein.

Typically, reading data from a disk or other data source is typically the bottleneck for salvaging renderable content, and needs to be carefully managed. To manage this bottleneck, as shown in FIG. 9, with reference to FIGS. 1 through 8B, the algorithm 386 reads a configurable-sized span of data 390 into memory 315 and, while that span of data 390 is being processed, reads additional data 301 into an in-memory data cache 316. Reading data 301 into memory 315 before it is needed by the algorithm 386 gives all subsequent processes faster access to data 301. The salvaging buffer 317 maintains in the memory 315, the current span of data 390a, the pre-read next span of data 390c, and a cache of a configurable number of previous spans of data 390b. This read ahead functionality is achieved by maintaining a data cache (or read buffer) 316 in memory 315 separately from the salvaging buffer 317.

The next span of data 390c is not read until all modules 385 are finished interrogating the current span of data. However, all modules 385 remain able to access previously read spans of data 390b in the cache 316. Once all modules 385 finish with the current span of data 390a, the processor 335 copies a new span of data 390x into memory 315, which permits the modules 385 to access this new span of data 390x and the processor 335 queues another span of data 390z in the cache 316. The algorithm 386 prevents any one of the modules 385 from searching too far ahead of the other modules which may cause "data thrashing", which is the rapid exchange of data between random access memory and storage memory, and which may cause the performance processor 335 to degrade or collapse. The processor 335 thereby ensures that data 301 is always ready for modules 385 before the modules 385 are ready to interrogate the data 301, which increases salvaging speed for datasets including multiple types of digital content 325 . . . 325x.

Every span of data 390 that is read is hashed (i.e., provided a specific digital fingerprint) before the salvaging modules 385 access the data 301, and the hashes 398 are stored for reference in comparison to other spans of data 390. Any module 385 that identifies potentially recoverable digital content 325a within a span of data 390 reports it to the processor 335. If no modules 385 discover potentially recoverable digital content 325a, then that hash 398 is marked for skipping. When another span of data 390 is hashed and matches a hash 398 in the reference for spans of data 390 marked for skipping then that span of data 390 is skipped because the data 301 is exactly the same. This enables the algorithm 386 to recognize digital patterns 320 in the data 301 and skip past regions that match previously interrogated data that did not yield possible positive results for any of the modules 385 such as regions of zeros or patterned wiped data.

FIG. 10A, with reference to FIGS. 1 through 9, is a flow diagram illustrating a computer-executable method for salvaging renderable content 400 comprising providing, in block 405, a set of instructions comprising a digital pattern 320 associated with digital content 325 to be salvaged, and a predetermined minimum threshold of usefulness 332 of the digital content 325. The method 400 further comprises providing, in block 410, a digital data source 380 comprising digital content 325 to be salvaged, wherein the digital content 325 comprises multiple types of digital content 325 . . . 325x. The method 400 further comprises simultaneously reading, in block 415, the digital content 325 by reviewing the multiple types of digital content 325 . . . 325x independently of one another using separate software salvaging modules 385 to review each specific type of digital content 325 . . . 325x. Block 420 provides filtering the digital content 325 by identifying potentially recoverable digital content 325a. Block 425 provides comparing the digital pattern 320 to the filtered digital content 325 to indicate matches between the filtered digital content 325b and the digital pattern 320. Block 427 provides reassembling or repairing the potentially recoverable digital content 325a. According to block 430, the method 400 comprises validating the matched digital content 326a by determining whether the matched digital content 326a is in a form that meets the predetermined minimum threshold of usefulness 332. Block 435 provides displaying the validated digital content 326.

Figure 10B:
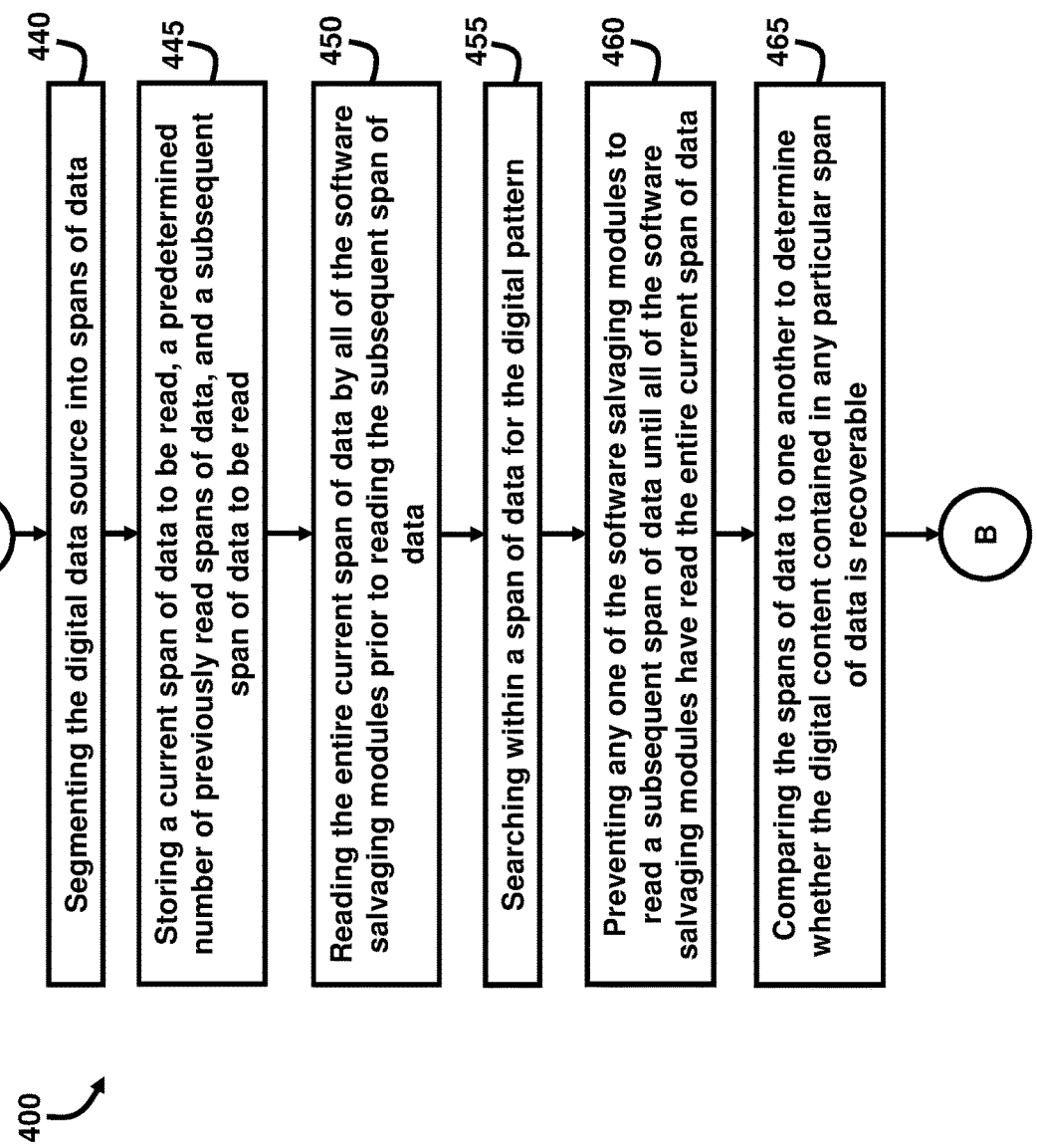
FIG. 10B is a flow diagram illustrating a second aspect of a method for salvaging renderable content, according to an embodiment herein.

As shown in FIG. 10B, with reference to FIGS. 1 through 10A, the computer-executable method for salvaging renderable content 400 may further comprise segmenting, in block 440, the digital data source 380 into spans of data 390. Block 445 provides storing a current span of data 390a to be read, a predetermined number of previously read spans of data 390b, and a subsequent span of data 390c to be read. Block 450 provides reading the entire current span of data 390a by all of the software salvaging modules 385 prior to reading the subsequent span of data 390c. The computer-executable method for salvaging renderable content 400 may further comprise searching, in block 455, within a span of data 390 for the digital pattern 320. The computer-executable method for salvaging renderable content 400 may further comprise preventing, in block 460, any one of the software salvaging modules 385 to read a subsequent span of data 390c until all of the software salvaging modules 385 have read the entire current span of data 390a. The computer-executable method for salvaging renderable content 400 may further comprise comparing, in block 465, the span of data 390 to one another to determine whether the digital content 325 contained in any particular span of data 395 is recoverable.

As shown in FIG. 10C, with reference to FIGS. 1 through 10B, the computer-executable method for salvaging renderable content 400 may further comprise hashing using hashes 398, in block 470, data segments 396 within the span of data 390 prior to performing simultaneous salvaging operations 397 on the digital data source 380, storing, in block 475, hashes 398x for each of the data segments 396a that do not contain any salvageable content 399, and comparing, in block 480, the hash 398 of each data segment 396 with the hashes 398x that do not contain any salvageable content 399. The computer-executable method salvaging renderable content 400 may further comprise skipping, in block 485, operations for salvaging renderable content 397 for each data segment 396 with a first hash 398a that matches a second hash 398b that does not contain any salvageable, renderable content 399.

Each of the modules 385 is a separate content salvaging module. Moreover, each of the modules 385 contains the codified digital patterns 320 or algorithms 386 to search for specific types of digital content 325 and perform quick checks to eliminate obvious false positives. To reduce the number of false positives, each of the modules 385 is configured to check for the expected data structures 365, preceding or following the potentially recoverable digital content 325a to be salvaged, immediately discarding non-compliant data. Each of the modules 385 runs independently of each other in parallel to maximize utilization of available processing resources of the processor 335 which increases salvaging speed. In one example, each of the modules 385 searches for a specific type of digital content 325 . . . 325x to the exclusion of the other modules. This allows for streamlined processing by the modules 385. In an example, there may be hundreds of modules 385 utilized in accordance with the embodiments herein. The modules 385 may be selected as being "on" or "off" from the user interface 345 to exclude the types of content that are known or believed to be absent from the data 301 or to provide filtering to eliminate the processing or output of unwanted file types. Accordingly, the computing device 300 maintains parallel processes for reading data 301 and for saving salvaging digital content 325. Moreover, each of the modules 385 is responsible for searching the input stream of data 301 for potentially salvageable digital content 325, and commanding the processor 335 to validate and output results to the user interface 345. Reassembly and repair operations may be performed, as needed, to create the salvaged digital content 325 renderable. In an example, the user interface 345 outputs the results in a virtual view; i.e., displaying the digital content 325 in a repaired and/or fully rendered view based on pre-programmed data.

FIG. 11, with reference to FIGS. 1 through 10C, illustrates another embodiment that provides a system 500 containing a non-transitory computer readable medium 501 comprising computer-executable instructions 505, 510, 515, 520, 525, 530, 535, 540 that when executed cause a processor 335 of a computing device 300 to execute the computer-executable instructions 505, 510, 515, 520, 525, 530, 535, 540. For example, computer-executable instructions 505 may receive a digital pattern 320 associated with digital content 325 contained in a digital data source 380 comprising one or more types of digital content 325 . . . 325x. Computer-executable instructions 510 may receive a processing rule 30 comprising a useful standard of the digital content 325. Computer-executable instructions 515 may read the one or more types of digital content 325 . . . 325x independently of one another, and in parallel to one another using separate software salvaging modules 385 for each type of digital content 325. Computer-executable instructions 520 may identify potentially recoverable digital content 325a from the one or more types of digital content 325 . . . 325x. Computer-executable instructions 525 may match the potentially recoverable digital content 325a with the digital pattern 320. Computer-executable instructions 530 may determine whether the matched potentially recoverable digital content 326a satisfies the useful standard (i.e., threshold of usefulness 332). Computer-executable instructions 532 may reassemble or repair the matched potentially recoverable digital content 325a. Computer-executable instructions 535 may validate the matched potentially recoverable digital content 326a as recoverable digital content 326 upon satisfying a predetermined recoverability requirement 370. Computer-executable instructions 540 may display the validated recoverable digital content 326.

As shown in the block diagram of FIG. 12, with reference to FIGS. 1 through 11, the processor 335 may instruct a software salvaging module 385a to skip ahead in a span of data 390, during a reading process of bytes of data 391, by a length of bytes 394 that the software salvaging module 385a is searching. The software salvaging module 385a may step through the bytes of data 391 in a span of data 390 associated with a single data content type 393, land on a first byte of data 391a in the span of data 390, determine whether the first byte of data 391a matches one of the bytes 391x associated with the single data content type 393, and check whether the digital pattern 320 is present in the span of data 390 when the first byte of data 391a matches one of the bytes 391x associated with the single data content type 393.

The software salvaging module 385a may check whether a second byte of data 391b that is next to or previous to the first byte of data 391a matches the next or previous byte of data 391y, 391z in the digital pattern 320. The software salvaging module 385a may shift to a next byte of data 391y when the first byte of data 391a matches a first byte of data 321a in the digital pattern 320 to determine whether the potentially recoverable digital content 325a matches with the digital pattern 320. The software salvaging module 385a may shift to a previous byte of data 391z when the first byte of data 391a matches a second byte of data 321b in the digital pattern 320 to determine whether the potentially recoverable digital content 325a matches with the digital pattern 320.

In the context of digital/multimedia evidence, salvaging renderable content can recover valuable digital evidence that would otherwise be missed, including deleted multimedia, communications, and documents. The embodiments herein salvage digital content 325 previously not recoverable (i.e., fewer false negatives), and does this with less wasted time reviewing junk output (i.e., fewer false positives).

The process of salvaging renderable content can be applied to any digital data, including (a) content no longer referenced by a file system such as unallocated space and slack space, (b) content within corrupt files, and (c) content embedded within other data structures. As such, this process can be applied to any data source, including but not limited to storage media, computer memory, virtual memory (swap space), smartphone FLASH memory, network traffic, and undocumented file formats.

The embodiments herein provide a technique, which may be used in digital forensic activity that involves recovery of digital content that has been corrupted or deleted, such as document recovery, including in law enforcement investigations, administrative inquiries, forensic accounting matters, and intelligence data exploitation operations. The embodiments herein are optimized for the simultaneous salvaging of multiple content types. Moreover, the embodiments herein are modular to allow for easy implementation or replacement of components to use new/improved search mechanisms, pattern matching algorithms, and validation methods.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. A computing device comprising:
a memory to store:
a digital pattern associated with computer-recoverable digital content contained in multiple types of digital content; and
a computer-executable processing rule defining a predetermined threshold of usefulness of the computer-recoverable digital content;
a processor to:
write the multiple types of digital content into a specified location in the memory;
read the multiple types of digital content simultaneously to one another and independently of one another;
identify the computer-recoverable digital content from the multiple types of digital content;
compare the computer-recoverable digital content with the digital pattern;
reassemble or repair the computer-recoverable digital content; and
remove, from the specified location in the memory, the computer-recoverable digital content that does not satisfy the predetermined threshold of usefulness;
a user interface to display the computer-recoverable digital content remaining in the specified location in the memory.

2. The computing device of claim 1, wherein the specified location in the memory comprises a virtual storage location to store the computer-recoverable digital content, and wherein the user interface is to display the computer-recoverable digital content stored in the virtual storage location.

3. The computing device of claim 1, wherein the memory is to store metadata of the computer-recoverable digital content in a retrievable renderable fragment of the computer-recoverable digital content stored in the memory.

4. The computing device of claim 3, wherein the computer-recoverable digital content comprises complete or partial electronic files that have been deleted, corrupted, or embedded in another data structure.

5. The computing device of claim 1, wherein the processor is to compare the computer-recoverable digital content with the digital pattern in a unique manner for each type of digital content being read.

6. The computing device of claim 1, wherein the processor is to validate the computer-recoverable digital content based on whether the computer-recoverable digital content is in a form that is useable according to a renderability requirement.

7. The computing device of claim 6, wherein the user interface is to display only validated computer-recoverable digital content.

8. A computer-executable method for salvaging renderable content comprising:
providing a set of instructions comprising:
a digital pattern associated with digital content to be salvaged; and
a predetermined minimum threshold of usefulness of the digital content;
providing a digital data source comprising digital content to be salvaged, wherein the digital content comprises multiple types of digital content;
simultaneously reading the digital content by reviewing the multiple types of digital content independently of one another using separate software salvaging modules to review each specific type of digital content;
filtering the digital content by identifying potentially recoverable digital content;
comparing the digital pattern to the filtered digital content to indicate matches between the filtered digital content and the digital pattern;
reassembling or repairing the potentially recoverable digital content;
validating the matched digital content by determining whether the matched digital content is in a form that meets the predetermined minimum threshold of usefulness; and
displaying the validated digital content.

9. The computer-executable method for salvaging renderable content of claim 8, comprising:
segmenting the digital data source into spans of data;
storing a current span of data to be read, a predetermined number of previously read spans of data, and a subsequent span of data to be read; and
reading the entire current span of data by all of the software salvaging modules prior to reading the subsequent span of data.

10. The computer-executable method for salvaging renderable content of claim 9, comprising searching within a span of data for the digital pattern.

11. The computer-executable method for salvaging renderable content of claim 9, comprising preventing any one of the software salvaging modules to read a subsequent span of data until all of the software salvaging modules have read the entire current span of data.

12. The computer-executable method for salvaging renderable content of claim 9, comprising comparing the spans of data to one another to determine whether the digital content contained in any particular span of data is recoverable.

13. The computer-executable method for salvaging renderable content of claim 9, comprising:
hashing data segments within a span of data prior to performing simultaneous salvaging operations on the digital data source;
storing hashes for each of the data segments that do not contain any salvageable content; and
comparing the hash of each data segment with the hashes that do not contain any salvageable content.

14. The computer-executable method for salvaging renderable content of claim 13, comprising skipping operations for salvaging renderable content for each data segment with a first hash that matches a second hash that does not contain any salvageable content.

15. A non-transitory computer readable medium comprising computer-executable instructions that when executed cause a processor of a computing device to:
receive a digital pattern associated with digital content contained in a digital data source comprising a plurality of types of digital content;
receive a processing rule comprising a useful standard of the digital content;
read a type of digital content of the plurality of types of digital content independently of another type of digital content of the plurality of types of digital content, and in parallel to one another using separate software salvaging modules for each type of digital content;
identify potentially recoverable digital content from the plurality of types of digital content;
match the potentially recoverable digital content with the digital pattern;
determine whether the matched potentially recoverable digital content satisfies the useful standard;
reassemble or repair the matched potentially recoverable digital content;
validate the matched potentially recoverable digital content as recoverable digital content upon satisfying a predetermined recoverability requirement; and
display the validated recoverable digital content.

16. The non-transitory computer readable medium of claim 15, wherein the processor is to instruct a software salvaging module to skip ahead in a span of data, during a reading process of bytes of data, by a length of bytes that the software salvaging module is searching.

17. The non-transitory computer readable medium of claim 16, wherein the software salvaging module is to:
step through the bytes of data in a span of data associated with a single data content type;
land on a first byte of data in the span of data;
determine whether the first byte of data matches one of the bytes associated with the single data content type; and
check whether the digital pattern is present in the span of data when the first byte of data matches one of the bytes associated with the single data content type.

18. The non-transitory computer readable medium of claim 17, wherein the software salvaging module is to check whether a second byte of data that is next to or previous to the first byte of data matches the next or previous byte of data in the digital pattern.

19. The non-transitory computer readable medium of claim 18, wherein the software salvaging module is to shift to a next byte of data when the first byte of data matches the first byte of data in the digital pattern to determine whether the potentially recoverable digital content matches with the digital pattern.

20. The non-transitory computer readable medium of claim 18, wherein the software salvaging module is to shift to a previous byte of data when the first byte of data matches a second byte of data in the digital pattern to determine whether the potentially recoverable digital content matches with the digital pattern.

* * * * *